(No Model.)
A. VETORSKEY.
DIVIDING INSTRUMENT.
No. 545,396. Patented Aug. 27, 1895.
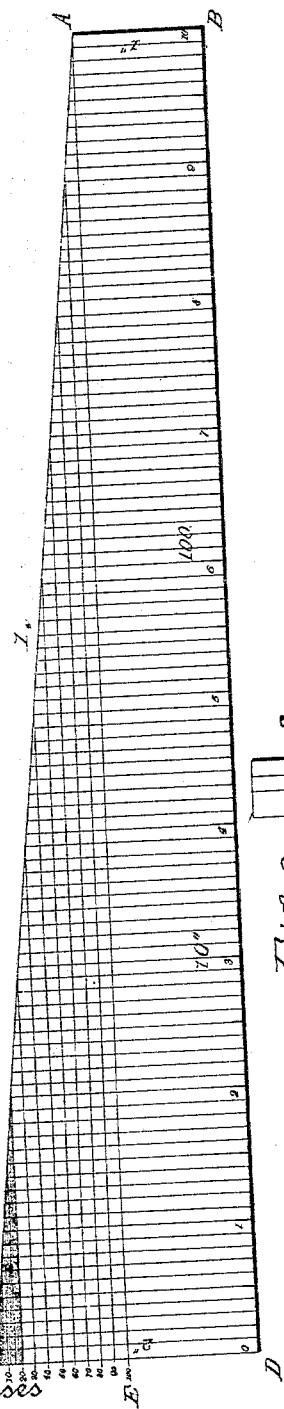
Fig. 1.
Fig. 2.
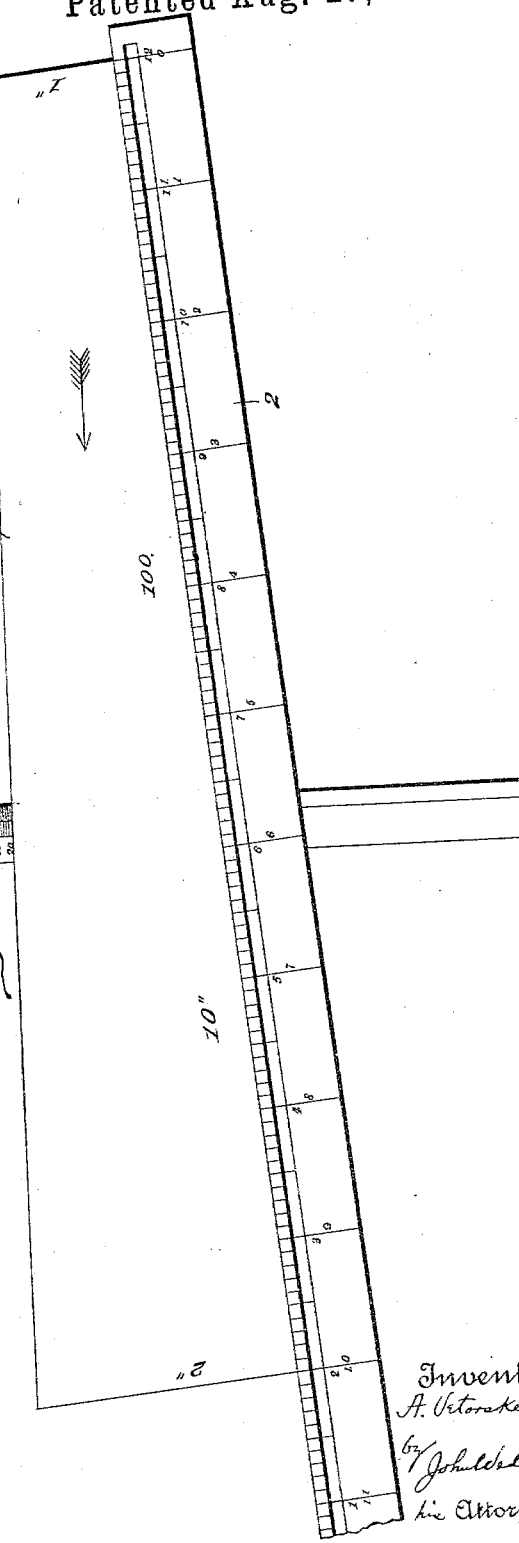
Witnesses
Geo. L. Gatchel.
W. P. Wilson.
Inventor
A. Vetorskey
by John Wedderburn
his Attorney.

UNITED STATES PATENT OFFICE.

ANTHONY VETORSKEY, OF BUFFALO, NEW YORK.

DIVIDING-INSTRUMENT.

SPECIFICATION forming part of Letters Patent No. 545,396, dated August 27, 1895.

Application filed March 8, 1895. Serial No. 540,928. (No model.)

*To all whom it may concern:*

Be it known that I, ANTHONY VETORSKEY, a citizen of the United States, residing at Buffalo, in the county of Erie and State of New York, have invented certain new and useful Improvements in Dividing-Instruments; and I do hereby declare the following to be a full, clear, and exact description of the invention, such as will enable others skilled in the art to which it appertains to make and use the same.

My invention relates to improvements in dividing-instruments, the object of the same being to provide a device adapted to accurately divide or graduate into extremely small parts.

The invention consists in employing, in connection with an ordinary straight-edged graduated ruler, a graduated ruler of irregular shape, the same being along one side a multiple of linear units in length, having edges at right angles thereto, one of which is a single unit of length and the other is some proportionate part, either greater or less, of a unit of length, the remaining side, therefore, being at an angle to the opposite thereof.

The invention is clearly illustrated in the accompanying drawings, in which—

Figure 1 represents, diagrammatically, the principle upon which my invention is adapted to work; and Fig. 2 represents a plan view showing the application of the same to graduating a rule into distances of one one-hundredth of an inch apart.

In Fig. 1 the quadrilateral A B C D has a base of ten inches, one of its edges A B being one inch in length and the opposite edge thereof being two inches in length. Say, for example, then, that each inch on the base B D is graduated into tenths. Lines drawn at right angles to the base B D from each one of these graduations will divide the line A C into one hundred equal parts, each being slightly greater than one-tenth of an inch. A line drawn from the point A parallel to B D will intersect the line C D at its center E. C E therefore is one inch in length. Lines drawn parallel to B D from each point of intersection of the line A C will divide the line C E into one hundred equal parts, which will each be one one-hundredth of an inch in length. On this principle of division, therefore, my invention depends.

In carrying out the same I propose to use a series of plates 1, constructed according to the figure A B C D, but at different dimensions, according to the different measurements it is desired to make and the different system of graduations into which the ruler 2 is divided. Say, for example, I employ a plate 1 of the same dimensions as those described for the figure A B C D and I desire to divide a ruler 3 into one hundred parts to the inch. The plate 1 is placed against the straight-edged ruler 2, which is divided into inches and tenths, the opposite inclined edge being in contact with the edge of the ruler 3. It is evident that by moving the said plate 1 one-tenth of an inch it will register one one-hundredth of an inch along the ruler 3. By moving it two-tenths on the ruler 2 it will measure two one-hundredths on the ruler 3, and so on.

If it is desired to use my invention in connection with a ruler divided off into inches and sixteenths of inches, I use a plate 1, which has one edge six and one-fourth inches long (equal to one hundred sixteenths of an inch) and has its side edges one and two inches in length, respectively. By applying this to the ruler 2 in the manner described before a movement of this plate 1 one-sixteenth of an inch will register one one-hundredth of an inch along its inclined edge. By moving it an eighth of an inch, two-hundredths will be registered, and so on. If it is desired to divide into hundredths, using in connection with my plate a ruler divided off into eighths of an inch only, one side of the plate 1 should be made twelve and one-half inches in length (one hundred eighths of an inch) and the edges thereof one and two inches in length, respectively. The movement of the plate 1 as thus constructed along the ruler 2 one-eighth of an inch will register one one-hundredth of an inch along the ruler 3. If it is desired to divide into thousandths of an inch, it may be done in the same manner by using a plate 1 ten inches in length on one side and its edges one inch and nine-tenths of an inch in length, respectively. With this form of plate the movement of the said plate along the ruler 2 one-tenth of an inch will register on the ruler 3 one one-thousandth of an inch. These plates may be made in as many shapes and dimensions as occasion may require, the principle of construction of each, however, being the same.

Having now described my invention, what I claim as new, and desire to secure by Letters Patent, is—

In a device of the character set forth, the combination with a ruler, divided off into units of length and proportional parts of units of length, of a dividing or graduating plate to be used in connection therewith, the same having one side a multiple of linear units in length, one edge thereof a single linear unit in length and the other edge a proportional part of a linear unit in length, substantially as described.

In testimony whereof I have signed this specification in the presence of two subscribing witnesses.

ANTHONY VETORSKEY.

Witnesses:
 LOUIS BROWN,
 FRED. J. LANG.